(12) United States Patent
Yaguchi et al.

(10) Patent No.: US 7,603,857 B2
(45) Date of Patent: Oct. 20, 2009

(54) EXHAUST HEAT RECOVERY APPARATUS

(75) Inventors: Hiroshi Yaguchi, Susono (JP); Daisaku Sawada, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 515 days.

(21) Appl. No.: 11/449,636

(22) Filed: Jun. 9, 2006

(65) Prior Publication Data
US 2007/0000249 A1  Jan. 4, 2007

(30) Foreign Application Priority Data
Jun. 29, 2005  (JP)  ............... 2005-190341

(51) Int. Cl.
*F01B 29/10* (2006.01)
(52) U.S. Cl. ............... 60/517; 60/520; 60/526
(58) Field of Classification Search ............... 60/517, 60/520, 526
See application file for complete search history.

(56) References Cited

U.S. PATENT DOCUMENTS

| | | | |
|---|---|---|---|
| 4,794,752 A | 1/1989 | Redderson | |
| 5,934,076 A | 8/1999 | Coney | |
| 6,463,731 B1 * | 10/2002 | Warren | 60/39.6 |
| 6,474,058 B1 * | 11/2002 | Warren | 60/39.6 |
| 7,181,912 B2 | 2/2007 | Mori | |

FOREIGN PATENT DOCUMENTS

| | | |
|---|---|---|
| JP | A-49-041960 | 4/1974 |
| JP | A-56-012034 | 2/1981 |
| JP | A 58-192951 | 11/1983 |
| JP | A-59-085459 | 5/1984 |
| JP | U 4-89836 | 8/1992 |
| JP | A-2002-266701 | 9/2002 |
| WO | WO 2005/033497 A1 | 4/2005 |

* cited by examiner

*Primary Examiner*—Hoang M Nguyen
(74) *Attorney, Agent, or Firm*—Oliff & Berridge, PLC

(57) ABSTRACT

An exhaust heat recovery apparatus includes a first piston; a second piston; a first cylinder in which the first piston reciprocates; a second cylinder in which the second piston reciprocates; and a heat exchanger. The heat exchanger includes a heater that is independently shiftable with respect to at least one of the first cylinder and the second cylinder, and has one end portion arranged at a side of the first cylinder and receiving heat from heat medium, a regenerator that is arranged at a side of another end portion of the heater, and a cooler that has one end portion arranged at a side of the regenerator and another end portion arranged at a side of the second cylinder.

6 Claims, 9 Drawing Sheets

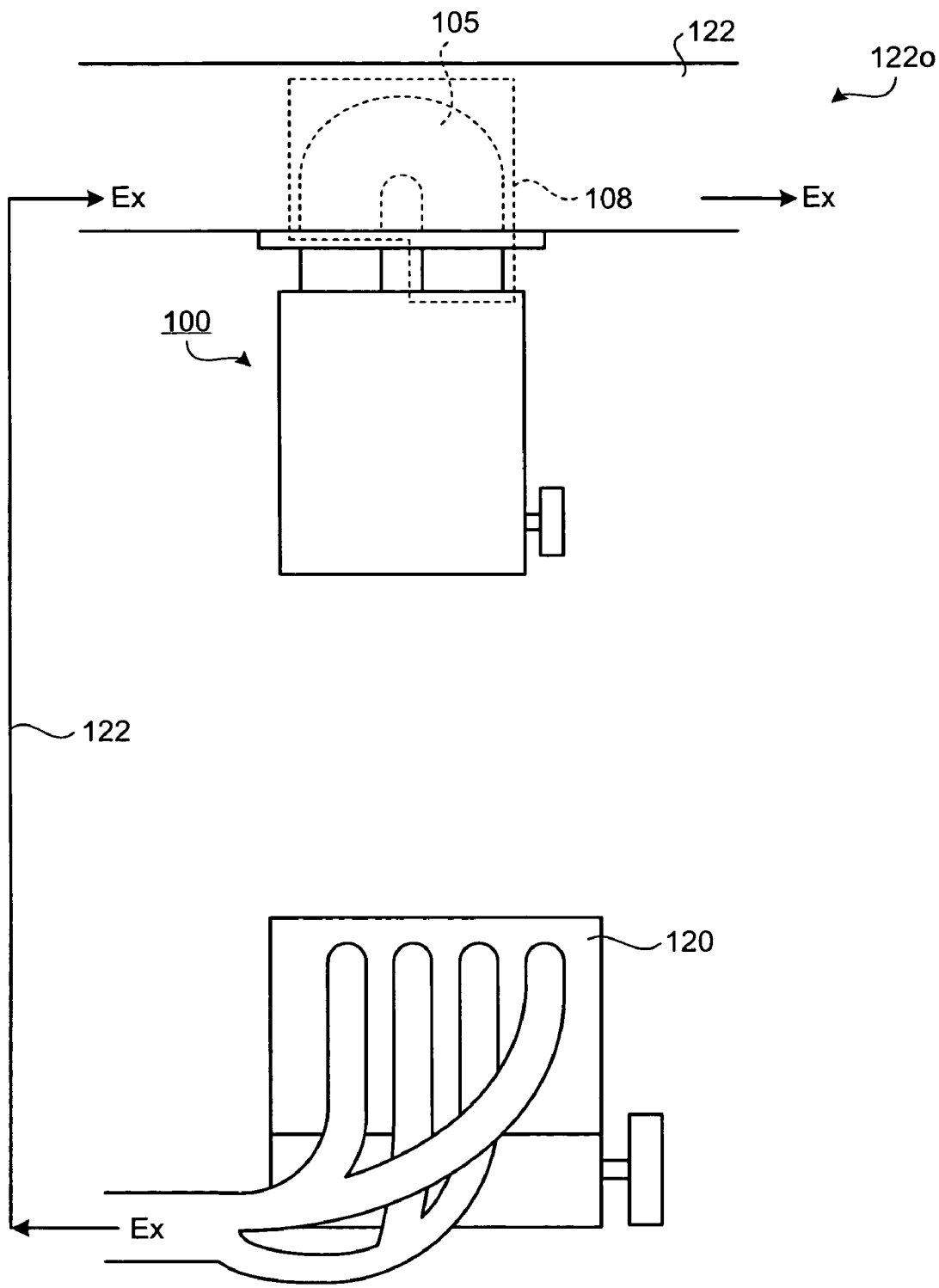

EXHAUST HEAT RECOVERY APPARATUS

BACKGROUND OF THE INVENTION

1. Field of the Invention

The present invention relates to an exhaust heat recovery apparatus that recovers exhaust heat of an exhaust passage of an internal combustion engine, factory exhaust heat, or the like.

2. Description of the Related Art

There exists an exhaust heat recovery apparatus that recovers the exhaust heat of, for example, an internal combustion engine installed in a vehicle such as car, bus, and truck, and factory exhaust heat, by using the heat engine. An example of the exhaust heat recovery apparatus mentioned above is a stirling engine, which has excellent theoretical heat efficiency. Japanese Patent Application Laid-Open (JP-A) No. H04-089836 discloses an a-type stirling engine of a V-type two-cylinder in which both cylinders are connected by a heat-conducting pipe. JP-A No. S58-192951 discloses a heat gas engine in which a heater is arranged inside a combustion chamber provided with a burner.

However, according to the a-type stirling engine disclosed in JP-A No. H04-089836, a deformation of the heat-conducting pipe, which is used as the heater, due to heat expansion may affect a cylinder connected to the heat-conducting pipe and a piston that reciprocates inside the cylinder. Also, according to the heat gas engine disclosed in JP-A No. S58-192951, a deformation of a heater tube, which constitutes the heater, due to heat expansion may affect the cylinder connected to the heater tube and the piston that reciprocates inside the cylinder. Further, in the heat gas engine disclosed in JP-A No. S58-192951, two cylinders are directly attached to the combustion chamber. Therefore, in these engines, the deformation caused by the heat expansion of the heat-conducting pipe, heater, or combustion chamber changes the distance between the cylinders. The change in the distance influences the reciprocating motion of the piston inside the cylinder, resulting in increases in friction and abrasion in the cylinder.

SUMMARY OF THE INVENTION

Thus, the present invention is provided in view of the foregoing, and an object is to provide an exhaust heat recovery apparatus that can reduce the deformation effect due to heat expansion of the heater.

To achieve an object as described above, an exhaust heat recovery apparatus according to one aspect of the present invention includes a first piston; a second piston; a first cylinder in which the first piston reciprocates; a second cylinder in which the second piston reciprocates; and a heat exchanger. The heat exchanger includes a heater that is independently shiftable with respect to at least one of the first cylinder and the second cylinder, and has one end portion arranged at a side of the first cylinder and receiving heat from heat medium, a regenerator that is arranged at a side of another end portion of the heater, and a cooler that has one end portion arranged at a side of the regenerator and another end portion arranged at a side of the second cylinder.

In the exhaust heat recovery apparatus, the heater included in the heat exchanger is independently and relatively shiftable with respect to at least one of the first cylinder and the second cylinder. Therefore, even if the heater deforms due to heat expansion in such a direction that the first cylinder and the second cylinder are separated from each other, the deformation of the heater is mostly not transferred to the first cylinder and the second cylinder. Thus, the influence of the deformation of heater by the heat expansion can be minimized during operation of the exhaust heat recovery apparatus. In some of the exhaust heat recovery apparatuses, a gas bearing is employed to make the piston reciprocate inside the cylinder in order to realize the recovery of heat energy from low-quality energy source, i.e., exhaust heat. The exhaust heat recovery apparatus is advantageous also in such a case, since the exhaust heat recovery apparatus according to one aspect of the present invention can minimize the influence of deformation of the heater by heat expansion, thereby maintaining the clearance between the cylinder and the piston in a permissible range. As a result, the gas bearing arranged between the cylinder and the piston can sufficiently function to realize a stable operation of exhaust heat recovery.

The heater may be secured to the first cylinder, and be independently shiftable with respect to the second cylinder.

The cooler may be directly or indirectly attached to the second cylinder, and the regenerator and the cooler may be shiftable relative to each other.

The heater may have an approximately U-shape, and the exhaust heat recovery apparatus may further include a guiding portion that is arranged near another end portion of the heater in a direction in which the another end portion shifts away from the one end portion of the heater due to heat expansion of the heater.

The exhaust heat recovery apparatus may further include a base, and the first cylinder and the second cylinder may be secured to the base.

Thus, the exhaust heat recovery apparatus can reduce the influence of deformation of the heater due to heat expansion.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a schematic view illustrating an exhaust passage of a combustion engine with the stirling engine attached thereto;

DETAILED DESCRIPTION OF THE PREFERRED EMBODIMENTS

Exemplary embodiments of the present invention will be described in detail below with reference to the drawings. The invention is not limited to the embodiments. The embodiments may include some components that are easily achieved by a person skilled in the art or that are substantially the same as the conventional components. In the following explanation, a stirling engine is used as an exhaust heat recovery apparatus in which the exhaust heat of an internal combustion engine is recovered; however, the recovery object of the exhaust heat may not be limited to the internal combustion engine. Thus, the exhaust heat recovery apparatus may recover the exhaust heat of recovery objects such as factory, plant, or power plant.

Figure 1:
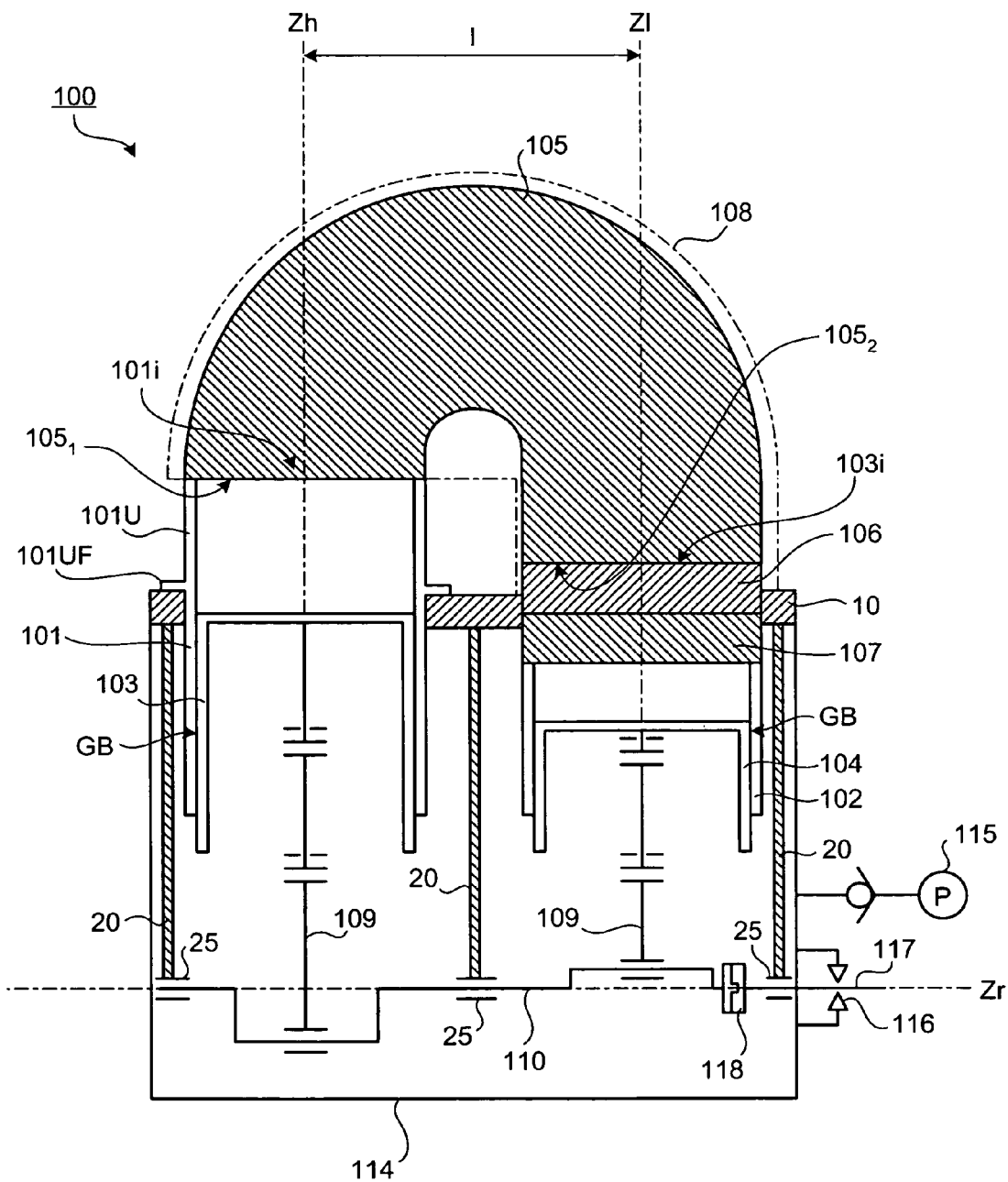
FIG. 1 is a cross-sectional view of a stirling engine being an exhaust heat recovery apparatus according to an embodiment.
Figure 2:
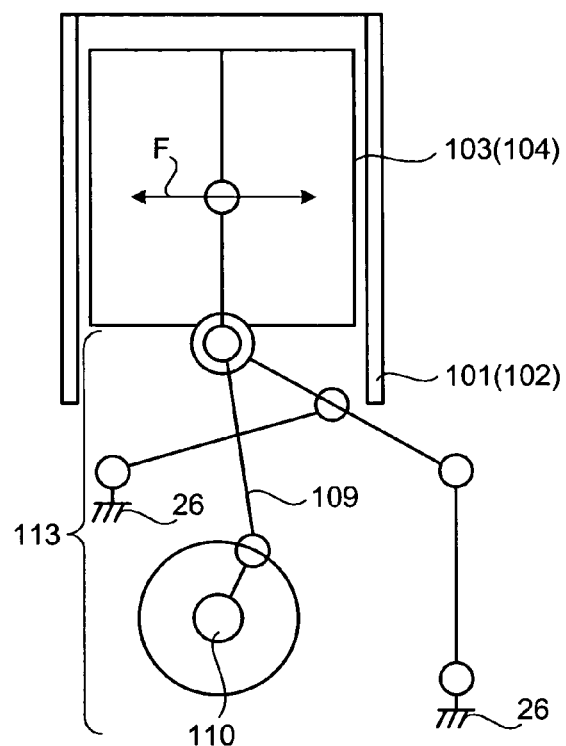
FIG. 2 is a schematic view illustrating an approximate linear mechanism.
Figure 3:
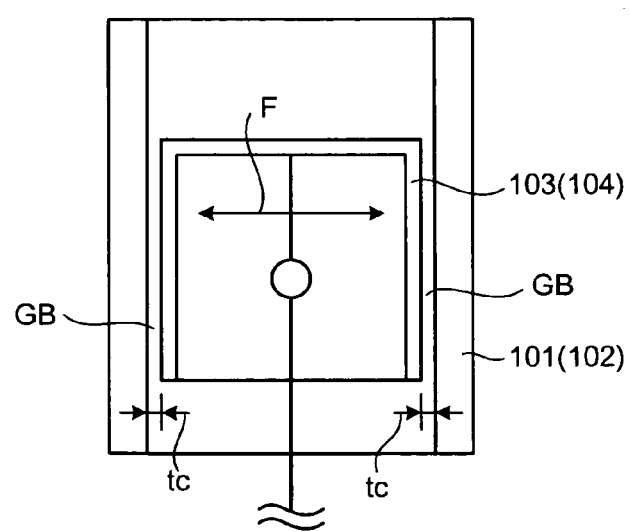
FIG. 3 is a schematic view illustrating a gas bearing that supports a piston.

FIG. 1 is a cross-sectional view of a stirling engine being an exhaust heat recovery apparatus according to an embodiment. FIG. 2 is a schematic view illustrating an approximate linear mechanism. FIG. 3 is a schematic view illustrating a gas bearing that supports a piston. The stirling engine will be first explained. A stirling engine 100, which is the exhaust heat recovery apparatus according to the present embodiment, is so-called α-type inline two-cylinder stirling engine, in which a high-temperature piston 103 housed in a high-temperature cylinder 101 and a low-temperature piston 104 housed in a low-temperature cylinder 102 are arranged in-line. Here, the high-temperature cylinder 101 may be referred to as a first cylinder, the low-temperature cylinder to as a second cylinder, the high-temperature piston to as a first piston, and the low-temperature piston to as a second piston.

The high-temperature cylinder 101 and the low-temperature cylinder 102 are directly or indirectly supported and fixed by a base 10, which is a reference body. In the stirling engine 100 according to the present embodiment, the base 10 is reference point for each component of the stirling engine 100. This configuration secures a relative position of each component precisely. Further, as will be described below, the stirling engine 100 of the present embodiment has gas bearings GB between the high-temperature cylinder 101 and the high-temperature piston 103, and between the low-temperature cylinder 102 and the low-temperature piston 104. Directly or indirectly attaching the high-temperature cylinder 101 and the low-temperature cylinder 102 to the base 10 makes an accurate clearance between the piston and the cylinder, so that the gas bearing GB exerts its effect sufficiently. Furthermore, having the gas bearing GB facilitates the assembly of the stirling engine 100. The base 10 also has an advantage that it can be used as a reference for attaching the stirling engine 100 to the exhaust heat recovery object, for example, an exhaust passage.

A heat exchanger 108 which includes an approximately U-shaped heater 105, a regenerator 106, and a cooler 107 is arranged between the high-temperature cylinder 101 and the low-temperature cylinder 102. One end portion of the heater 105 is arranged about the high-temperature cylinder 101 side, and the other end portion is arranged at the regenerator 106 side. One end portion of the regenerator 106 is arranged at the heater 105 side, and the other end portion is arranged at the cooler 107 side. One end portion of the cooler 107 is arranged at the regenerator 106 side, and the other end portion is arranged about the low-temperature cylinder 102.

A working fluid (air in the present embodiment) is contained in the high-temperature cylinder 101, low-temperature cylinder 102, and heat exchanger 108. A stirling cycle is configured by a supplied heat from the heater 105 and the exhausted heat from the cooler 107, driving the high-temperature piston 103. Here, each of the heater 105 and the cooler 107 may be a bundle of tubes made of material having high heat conductivity and excellent heat resistance. The regenerator 106 may be formed from porous heat storage material. The heater 105, the cooler 107, and the regenerator 106 is not limited to the examples described above, and may be provided in form suitable for, for example, a heat condition of the exhaust heat recovery object and the specification of the stirling engine 100.

The high-temperature cylinder 101 and the low-temperature cylinder 102 support the high-temperature piston 103 and the low-temperature piston 104, respectively, through the gas bearing GB. In other words, the stirling engine 100 has a configuration in which the piston is supported inside the cylinder, without having piston ring between the piston and the cylinder. Therefore, the friction between the piston and cylinder is reduced, and the heat efficiency of the stirling engine 100 is improved. Further, by reducing the friction between the piston and the cylinder, the exhaust heat may be recovered by driving the stirling engine 100 under a condition of low heat source and low temperature difference that is represented by the exhaust heat recovery of the internal combustion engine.

As shown in FIG. 3, in order to make the gas bearing GB, a clearance tc held between the high-temperature piston 103 and the high-temperature cylinder 101 is several tens of micrometers over the whole circumference of, for example, the high-temperature piston 103. The low-temperature piston 104 and the low-temperature cylinder 102 have the same configuration. The high-temperature cylinder 101, high-temperature piston 103, low-temperature cylinder 102, and low-temperature piston 104 can be formed from, for example, easily processed metal.

Reciprocating motions of the high-temperature piston 103 and the low-temperature piston 104 are transferred to a crankshaft 110 through a connecting rod 109, and converted into rotational motion of the crankshaft 110. As shown in FIG. 2, an approximate linear mechanism 113 supports the connecting rod 109, and the connecting rod 109 moves the high-temperature piston 103 approximately linearly in reciprocating motion. The approximate linear mechanism 113 uses a grasshopper mechanism. Thus, side force F (force pointing radial direction of the piston) of the high-temperature piston 103 becomes nearly zero (0) since the approximate linear mechanism 113 supports the connecting rod 109, and the piston can be sufficiently supported by the gas bearing GB having small load ability. The low-temperature piston 104 is also connected to the crankshaft 110 by a configuration similar to the configuration of the high-temperature piston 103.

As shown in FIG. 1, the crankshaft 110 is rotatably supported by a bearing 25 that is located in a crankshaft supporting body 20. The crankshaft supporting body 20 is a board-shape member, and secured to the base 10. Further, the approximate linear mechanism 113 is supported by an approximate linear mechanism supporting portion 26 located at the crankshaft supporting body 20. At this point, the crankshaft supporting body 20 is secured to the base 10 independently of the high-temperature cylinder 101 and the low-temperature cylinder 102, in other words, the secured crankshaft supporting body 20 does not touch the cylinders. Therefore, the gas bearing GB functions sufficiently because the high-temperature cylinder 101 and the low-temperature cylinder 102 are not influenced by the vibration of the crankshaft 110 and the approximate linear mechanism 113, a heat expansion of the crankshaft 110, and the like.

As shown in FIG. 1, the high-temperature cylinder 101, high-temperature piston 103, crankshaft 110, approximate linear mechanism 113, and so on, constituting the stirling engine 100, are stored in a case 114. Inside of the case 114 is pressurized by a pressurizing unit 115, thus the working fluid inside the high-temperature cylinder 101, the low-temperature cylinder 102, and the heat exchanger 108 are pressurized in order to take out more output from the stirling engine 100.

Further, in the stirling engine 100 according to the present embodiment, a seal bearing 116 is attached to the case 114, and an output shaft 117 is supported by the seal bearing 116. The output shaft 117 and the crankshaft 110 are connected through a flexible coupling 118, and the output of the crankshaft 110 is transferred to the outside of the case 114 through the flexible coupling 118. In the present embodiment, an oldham coupling is used for the flexible coupling 118.

FIG. 4 is a schematic view illustrating an exhaust passage of a combustion engine with the stirling engine attached thereto. As shown in FIG. 4, when the stirling engine 100 is used for the exhaust heat recovery of the internal combustion engine 120, at least the heater 105 of the heat exchanger 108 included in the stirling engine 100 is arranged inside an exhaust passage 122 of the internal combustion engine. Here, the internal combustion engine may be represented by a gasoline engine, diesel engine, and the like. Then, heat energy from an exhaust gas (heat medium) Ex flowing inside the exhaust passage 122 toward an exhaust passage exit 122o is recovered by the heater 105 of the heat exchanger 108.

Here, as shown in FIG. 4, the heater 105 of the heat exchanger 108 described above is arranged inside a high temperature heat source such as the inside of the exhaust passage 122 of the internal combustion engine 120, in order to heat the working fluid flowing inside the heat exchanger 108. Therefore, while driving the stirling engine 100, the sizes of the heater 105 and the heat exchanger 108 that includes the heater 105 increase compared to the time when the stirling engine is cooled, due to the heat expansion of the heater 105 included in the heat exchanger 108.

An inter-axis distance 1 between the central axis Zh of the high-temperature cylinder 101 and Zl of the low-temperature cylinder 102 increases compared to the distance measured when the stirling engine 100 is cooled, because the heat expansion described above takes place when the heat exchanger 108 including the heater 105 is connected to the high-temperature cylinder 101 and the low-temperature cylinder 102. As a result, the clearance tc (FIG. 3) held between the cylinder and the piston cannot be maintained, with the result that the gas bearing GB may exert its effect appropriately. Thus, the change in clearance held between the cylinder and the piston caused by the heat expansion of the heat exchanger 108 is controlled by a configuration that will be described below in the present embodiment.

Figure 5A:
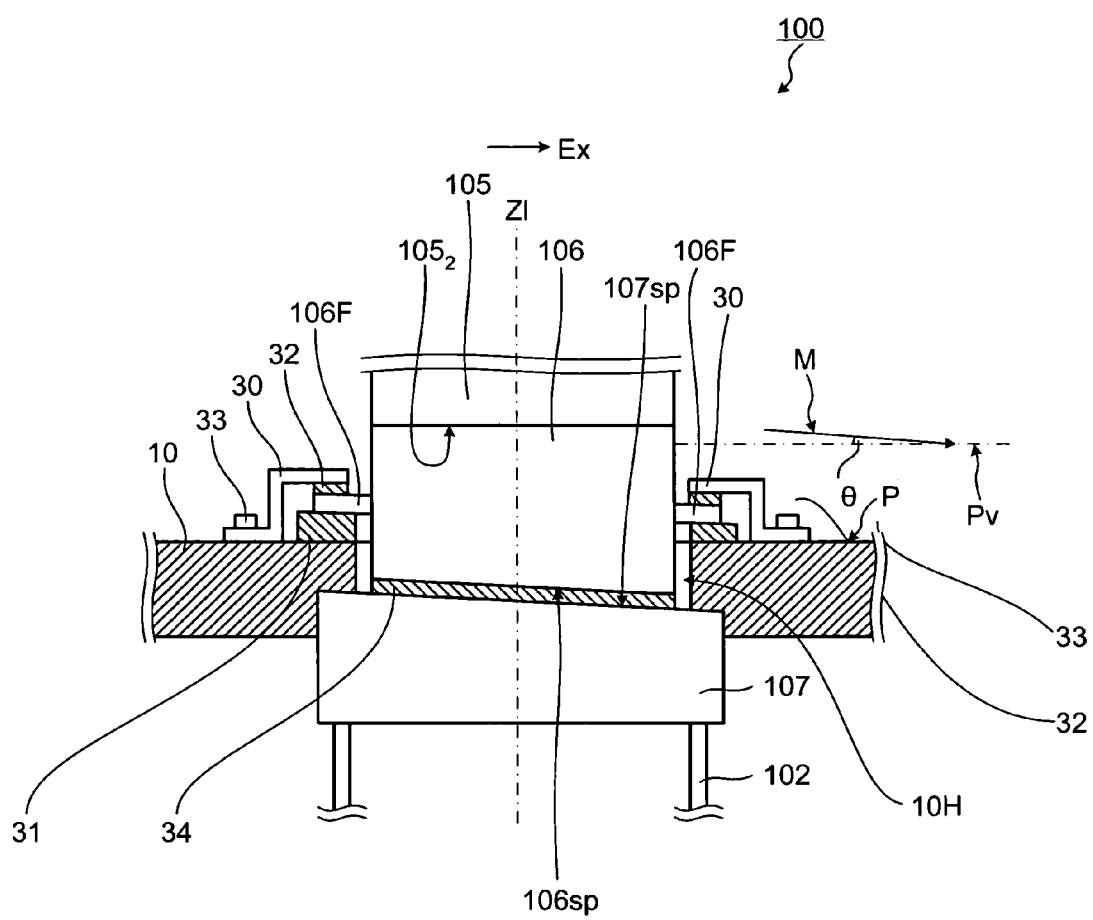
FIG. 5A is a schematic view showing a heater, a regenerator, and a cooler which is attached to the regenerator at the low-temperature cylinder side, of the stirling engine according to the present embodiment.
Figure 5B:
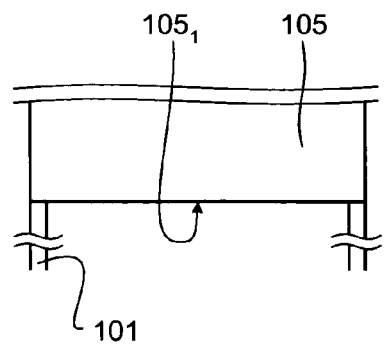
FIG. 5B is a schematic view showing the heater of the stirling engine at the high-temperature cylinder side.
Figure 6A:
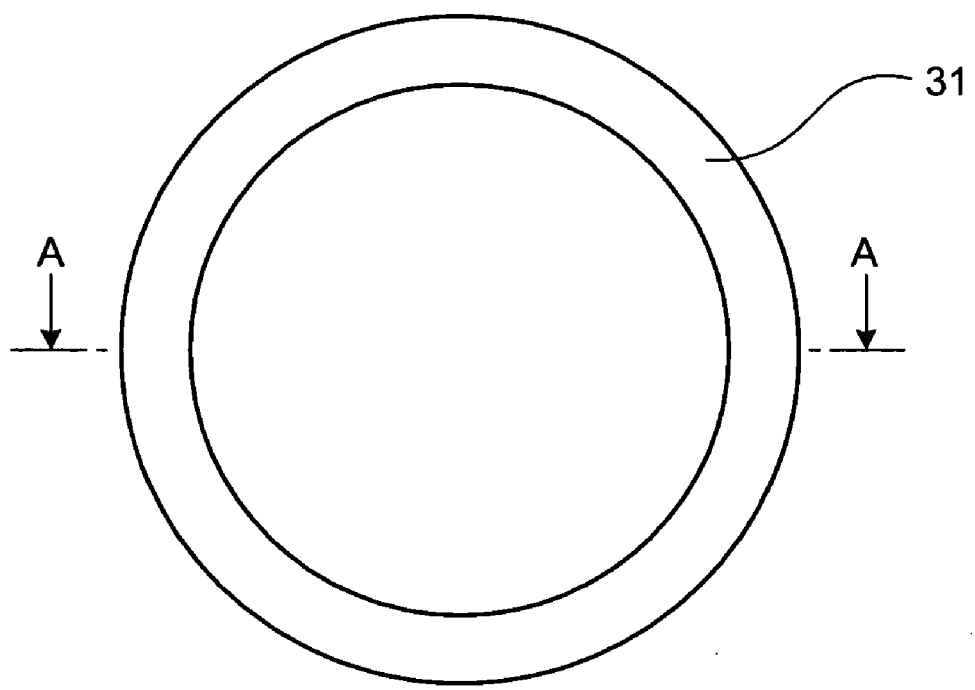
FIG. 6A is a plan view of a spacer used for attaching the regenerator.

FIG. 5A is a schematic view showing the heater, the regenerator, and the cooler which is attached to the regenerator at the low-temperature cylinder side, of the stirling engine according to the present embodiment. FIG. 5B is a schematic view showing the heater of the stirling engine at the high-temperature cylinder side. FIG. 6A is a plan view of a spacer used for attaching the regenerator.

Figure 6B:
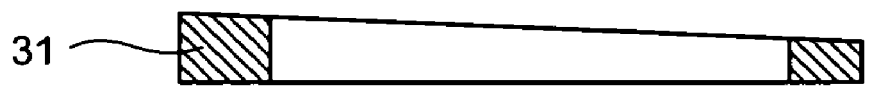
FIG. 6B is a cross-sectional view taken along line A-A of FIG. 6A.

FIG. 6B is a cross-sectional view taken along line A-A of FIG. 6A. In the stirling engine 100 according to the present embodiment, an attaching flange 101UF of a heater-attaching member 101U connected to the high-temperature cylinder 101 is secured to the base 10 (FIG. 1), and the regenerator 106 is shiftably attached thereto with respect to the cooler 107. Here, the heater 105 may be directly secured to the base 10 on the high-temperature cylinder 101 side.

Thus, the regenerator 106 to which the heater 105 is attached is arranged shiftably with respect to the low-temperature cylinder 102. Here, the regenerator 106 is shiftably provided in the direction in which the regenerator 106 intersects the central axis Zl of the low-temperature cylinder 102 (approximately orthogonal direction in the present embodiment) and in the direction approximately parallel to the flow direction of the exhaust gas Ex.

Even if the heater 105 deforms and causes to separate the high-temperature cylinder 101 and the low-temperature cylinder 102 due to the heat expansion, the regenerator 106 to which the heater 105 is attached shifts independently of the low-temperature cylinder 102 in the configuration described above. Thus, the clearance tc held between the cylinder and the piston (FIG. 3) is kept in a permissible range because the deformation of the heater 105 due to the heat expansion practically gives no influence on the high-temperature cylinder 101 and the low-temperature cylinder 102. As a result, while driving the stirling engine 100, the gas bearing GB (FIG. 1, FIG. 3) formed between the cylinder and the piston exerts its effect sufficiently because the influence of the heat expansion of the heater 105 is minimized. Next, more precise description of the attaching configuration of the regenerator 106 will be described.

As shown in FIGS. 5A and 5B, the regenerator 106 is attached to an attaching hole 10H of the base 10 by clearance fit. A regenerator flange 106F is provided at the outer periphery of the regenerator 106, and the regenerator flange 106F is sandwiched between a spacer 31 and an elastic body 32. As shown in FIG. 6, the spacer 31 has a ring-like shape. The spacer 31, the elastic body 32, and the regenerator flange 106F that is sandwiched between the two are all clamped by a regenerator clamp 30. Then, the regenerator 106 is attached to the base 10 by securing the regenerator clamp 30 to the base 10 using a bolt 33, which is a securing means.

By the regenerator clamp 30, the elastic body 32 presses the regenerator flange 106F. Since the regenerator flange 106F is attached to the base 10 through the elastic body 32 as described above, the regenerator 106 may shift relative to the base 10. Here, the regenerator 106 shifts along a regenerator-side end face 107sp of the cooler 107. Further, the cooler 107 is secured to the base 10, and the low-temperature cylinder 102 is secured to the base 10 through the cooler 107. Therefore, the regenerator 106 may shift in the direction approximately orthogonal to the central axis Zl of the low-temperature cylinder 102 and in the direction approximately parallel to the flow direction of the exhaust gas Ex, independently of the low-temperature cylinder 102. The cooler 107 is attached to the low-temperature cylinder 102 directly in the present embodiment; however, the cooler 107 and the low-temperature cylinder 102 may be indirectly attached to each other through a spacer, connecting member, and the like.

A seal 34 is provided between a cooler-side end face 106sp of the regenerator 106 and the regenerator-side end face 107sp of the cooler 107 in order to enclose the working fluid inside the regenerator 106 and the cooler 107. Thus, a working fluid leakage between the regenerator 106 and the cooler 107 is minimized. Further, the configuration of the present embodiment, in which the regenerator 106 is shiftable at the low-temperature side, i.e., at a position where the regenerator 106 is joined with the cooler 107, is advantageous to select a suitable material in comparison with a configuration in which the regenerator 106 is made shiftable at the high-temperature side. The stirling engine 100 having the above configuration also has an advantage that the sealing of the working fluid is relatively easy since the working fluid has low temperature and low pressure.

Here, since temperature of the working fluid heated inside the heater 105 changes from high to low in the regenerator 106, the heat-expanded length of the high-temperature cylinder 101 differs from the low-temperature cylinder 102 in length after the cylinders are heat-expanded. As a result, the heater 105 heat-deforms in the direction in which the high-temperature cylinder 101 and the low temperature cylinder 102 separate from each other, and in the direction in which the end portion of the heater 105 approaches the high-temperature cylinder 101 or the low-temperature cylinder 102, due to the heat expansion. Thus, the heater 105 heat-deforms in the oblique direction with respect to a base face P.

The stirling engine 100 according to the present embodiment includes a guiding portion (spacer 31) at the end portion $105_2$ side in which the end portion $105_2$ shifts due to the heat expansion of the heater 105. The guiding portion is formed along the shifting direction of one end portion $105_2$ of the heater 105 due to the heat expansion of the heater 105, with respect to the other end portion $105_1$ of the heater 105. More specifically, in the stirling engine 100, a cooler-side end face 106sp of the regenerator 106 and a regenerator-side end face 107sp of the cooler 107 are inclined to a predetermined inclination angle θ by using the spacer 31 (FIGS. 6A and 6B). The predetermined inclination angle θ is measured from a virtual base face Pv, that is parallel to the base face P. The inclination of the cooler-side end face (inclined face) 106sp and the regenerator-side end face (inclined face) 107sp are set so that the cooler-side end face 106sp and the regenerator-side end face 107sp decline toward the flow direction of the exhaust gas Ex and approach the low-temperature side cylinder 102.

In order to configure the stirling engine 100 as described above, the height of the spacer 31 is decreased in the flow direction of the exhaust gas Ex. Here, the flow direction of the exhaust gas Ex points from the high-temperature cylinder 101 to the low-temperature cylinder 102. Further, the inclination angle θ is set to an angle between the deforming direction of the heater 105 (direction indicated by arrow M in FIG. 5) and the base face P. By configuring the stirling engine 100 as described above, the heater 105 shifts along the deforming direction of the heater 105 since the regenerator 106 shifts along the inclined face of the regenerator-side end face 107sp or the cooler-side end face 106sp. As a result, when the regenerator 106 is shifted, decrease in endurance of the heater 105 may be controlled since the excessive stress affecting the heater 105 is reduced. Thus, the spacer 31 has a function of reducing the excessive stress affecting the heater 105 since the spacer 31 directs the end portion $105_2$ in the deforming direction of the heater 105. Here, the heat expansion of the heater 105 causes the deformation and shifts the end portion $105_2$. In the present embodiment, it is sufficient if the heater 105 is shifted independently relative to at least one of the high-temperature cylinder 101 and the low-temperature cylinder 102, and it is not necessary to provide the inclination described above.

Figure 7:
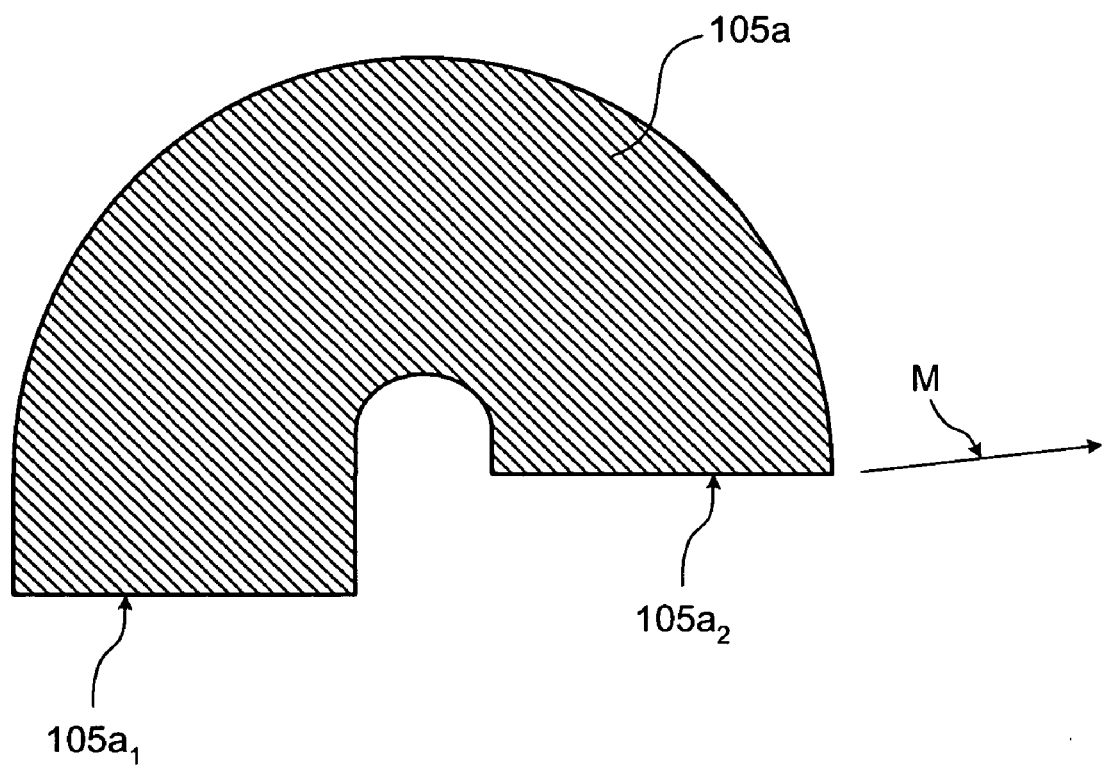
FIG. 7 is a schematic view of another example of a heater included in the stirling engine according to the present embodiment.
Figure 8A:
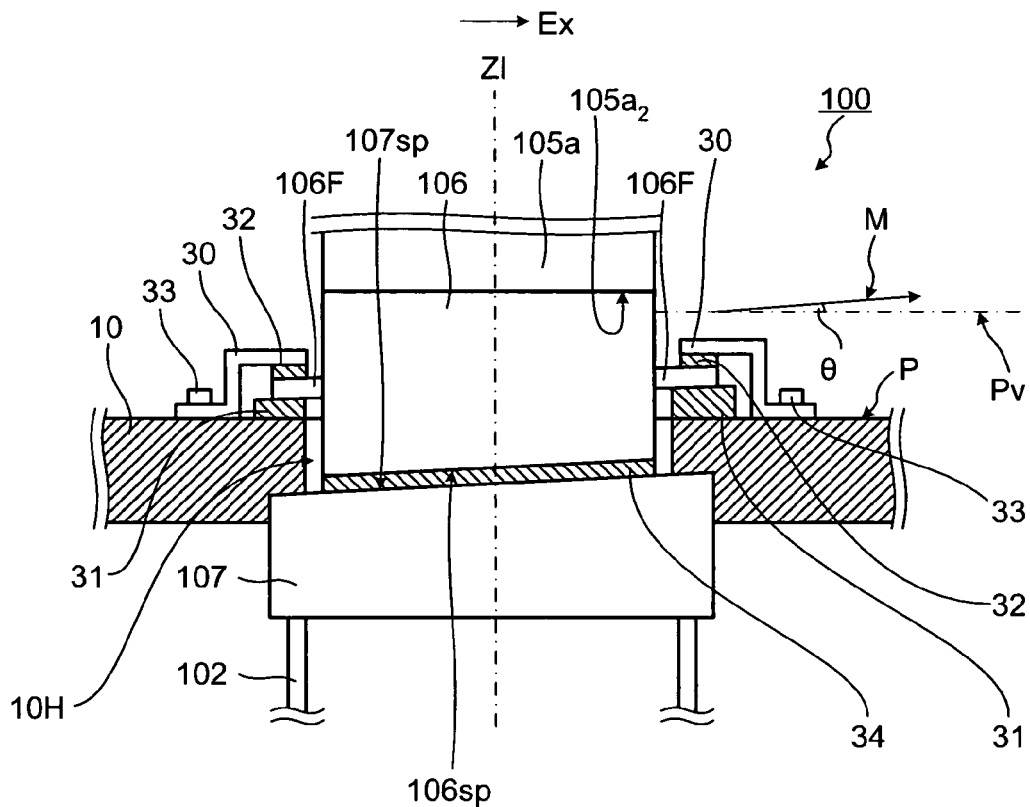
FIG. 8A is a schematic view showing the heater of FIG. 7, a regenerator, and a cooler which is attached to the regenerator at the low-temperature cylinder side, of the stirling engine.
Figure 8B:
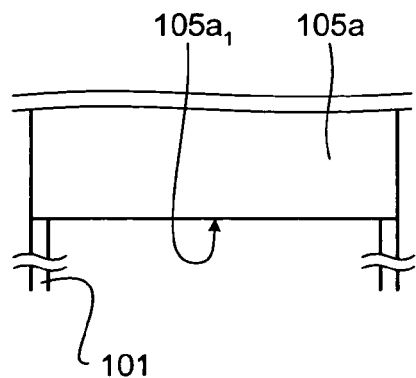
FIG. 8B is a schematic view showing the heater of FIG. 7 of the stirling engine at the high-temperature cylinder side.
Figure 9A:
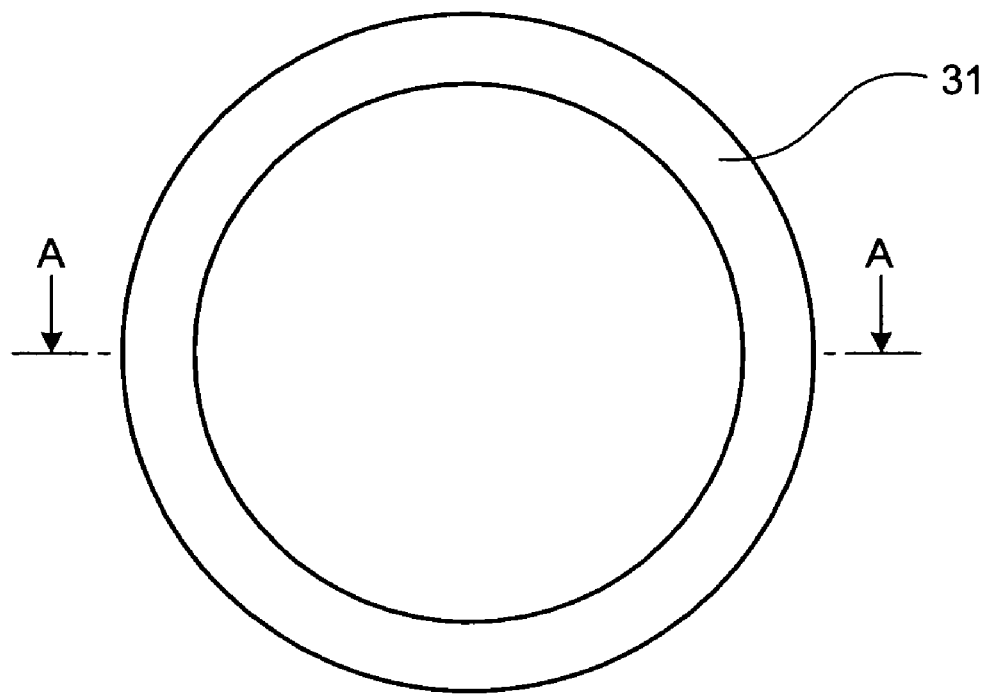
FIG. 9A is a plan view of a spacer used for attaching the regenerator.
Figure 9B:
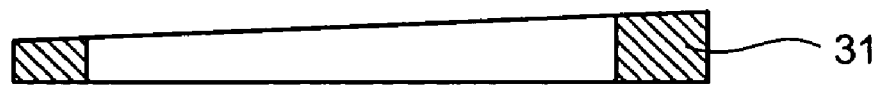
FIG. 9B is a cross-sectional view taken along line A-A of FIG. 9A.

FIG. 7 is a schematic view of another example of the heater provided in the stirling engine according to the present embodiment. FIG. 8A is a schematic view showing the heater of FIG. 7, the regenerator, and the cooler which is attached to the regenerator at the low-temperature cylinder side, of the stirling engine. FIG. 8B is a schematic view showing the heater of FIG. 7 of the Stirling engine at the high-temperature cylinder side. FIG. 9A is a plan view of the spacer used for attaching the regenerator. FIG. 9B is a cross-sectional view taken along line A-A of FIG. 9A. The heater 105 (FIG. 1) provided in the stirling engine 100 shown in FIG. 1 and described above has an approximately U-shape, and the length of the high-temperature cylinder 101 side is shorter than the length of the low-temperature cylinder 102 side. Therefore, as described above, the deforming direction is in the direction in which the high-temperature cylinder 101 and the low-temperature cylinder 102 separate from each other, and in the direction in which the heater 105 approaches to the low-temperature cylinder 102.

On the other hand, the heater 105a shown in FIG. 7 has an approximately U-shape, and a length of the high-temperature cylinder 101 side is longer than the length of the low-temperature cylinder 102 side. According to this configuration, the deforming direction at the heat expansion is the direction in which the high-temperature cylinder 101 and the low-temperature cylinder 102 separate from each other, and in the direction in which the end portion of the heater 105a moves away from the high-temperature cylinder 101 or the low-temperature cylinder 102 (the direction in which an end portion $105a_2$ moves away from the high-temperature side cylinder 101 in this example).

Although the stirling engine 100 is provided with the heater 105a described previously, the stirling engine 100 includes a guiding portion (spacer 31) at the end portion $105a_2$ side. When the heater 105 expands with heat, the end portion $105a_2$ shifts away from an end portion $105a_1$. The guiding portion is formed along the shifting direction of the portion $105a_2$ of the heater 105a. More specifically, in the stirling engine 100, the cooler-side end face 106sp of the regenerator 106 and the regenerator-side end face 107sp of the cooler 107 are inclined with a predetermined inclination angle θ by using the spacer 31 (FIGS. 9A and 9B). The predetermined inclination angle θ is measured from the virtual base face Pv that is parallel to the base face P. The inclination of the cooler-side end face (inclined face) 106sp and the regenerator-side end face (inclined face) 107sp are set so that the cooler-side end face 106sp and the regenerator-side end face 107sp shift away from the low-temperature cylinder 102 in the flow direction of the exhaust gas Ex.

In order to configure the stirling engine as described above, the height of the spacer 31 is set so as to increase in the flow direction of the exhaust gas (FIG. 8A). Further, the inclination angle θ is set to an angle between the deforming direction of the heater 105a (direction of arrow M in FIG. 8) and the base face P. By configuring the Stirling engine 100 as described above, the heater 105a shifts along the deformation direction of the heater 105a since the regenerator 106 shifts along the inclined face of the regenerator-side end face 107sp. As a result, when the regenerator 106 is shifted, decrease in endurance of the heater 105a may be suppressed since excessive stress affecting the heater 105a is reduced.

Figure 10:
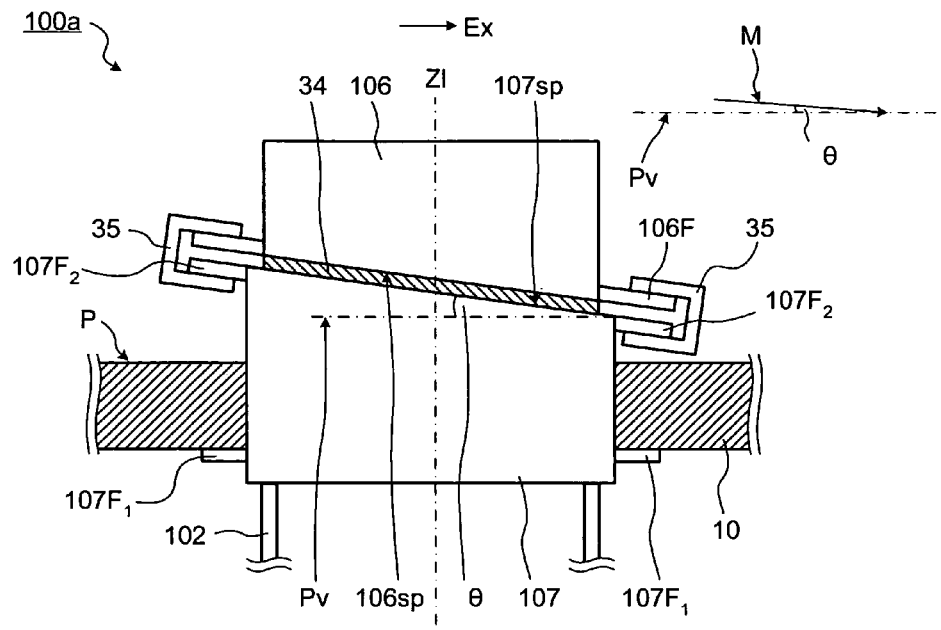
FIG. 10 is a schematic view showing a heater, a regenerator, and a cooler which is attached to the regenerator at the low-temperature cylinder side, of a stirling engine according to a first modification of the present embodiment.

A configuration of the first modification of the present embodiment is approximately similar to the configuration in the above embodiment; however, attaching configuration of the regenerator and the cooler is different. Thus, other configurations are similar to the embodiment described above. FIG. 10 is a schematic drawing showing the attaching configuration of the regenerator and the cooler of the stirling engine according to the first modification of the present embodiment.

In the stirling engine 100a as shown in FIG. 10, the cooler 107 is attached to the low-temperature cylinder 102 side of the base 10 by a base securing flange 107$F_1$ provided at the outer periphery of the cooler 107. The regenerator 106 is placed and held on top of the cooler 107 through the seal 34. The working fluid leakage between the regenerator 106 and the cooler 107 is minimized by the seal 34. The regenerator flange 106F provided at the outer periphery of the regenerator 106 and a regenerator attaching flange 107$F_2$ provided near the regenerator-side end face 107sp of the cooler 107 are sandwiched by a clamp 35 that is a regenerator attaching means.

Thus, the regenerator 106 is attached to the cooler 107, and the regenerator 106 shifts along the regenerator-side end face 107sp of the cooler 107. Further, the cooler 107 is secured to the base 10, and the low-temperature cylinder 102 is secured to the base 10 through the cooler 107. Therefore, the regenerator 106 may shifts in the direction approximately orthogonal to the central axis Zl of the low-temperature cylinder 102 and in the direction approximately parallel to the flow direction of the exhaust gas Ex, independently of the low-temperature cylinder 102.

In the stirling engine 100a according to the first modification as shown in FIG. 10, the cooler-side end face 106sp of the regenerator 106 and the regenerator-side end face 107sp of the cooler 107 are inclined with a predetermined inclination angle θ with respect to the virtual base face Pv that is parallel to the base face P. Here, the regenerator-side end face 107sp of the cooler 107 including the inclination described above corresponds to the guiding portion. The inclination of the cooler-side end face 106sp and the regenerator-side end face 107sp are provided in the way similar to the stirling engine 100 (FIGS. 5A and 5B) described in the above embodiment. The reason for providing the inclination is explained above in the present embodiment. Thus, the regenerator 106 may be shifted along the deforming direction of the heater 105, and while the regenerator 106 is shifted, decrease in endurance of the heater 105 may be suppressed since excessive stress affecting the heater 105 is reduced.

In the stirling engine 100a according to the first modification, the regenerator 106 in which the heater 105 is attached may also shifts independently of the low-temperature cylinder 102. Thus, the clearance tc (FIG. 3) held in between the cylinder and the piston is kept in a permissible range since the deformation of the heater 105 due to the heat expansion does not influence the high-temperature cylinder 101 and the low-temperature cylinder 102. As a result, the gas bearing GB (FIGS. 1 and 3) formed in between the cylinder and the piston functions sufficiently. Further, the stirling engine 100 of the first modification having the configuration in which the regenerator 106 is shiftable at the low-temperature side, i.e., with respect to the face the regenerator 106 and the cooler 107 contact each other, has an advantage in terms of material point of view in comparison with the configuration in which the regenerator is shiftable at the high-temperature side. Furthermore, sealing of the working fluid may be performed easily since the working fluid has low temperature and low pressure.

Although the regenerator 106 is shiftable in the configuration of the embodiment above and its modification, the heater 105 may be shiftably configured at the face where the heater 105 contacts with the regenerator 106 when the regenerator 106 is secured to the cooler 107.

Figure 11:
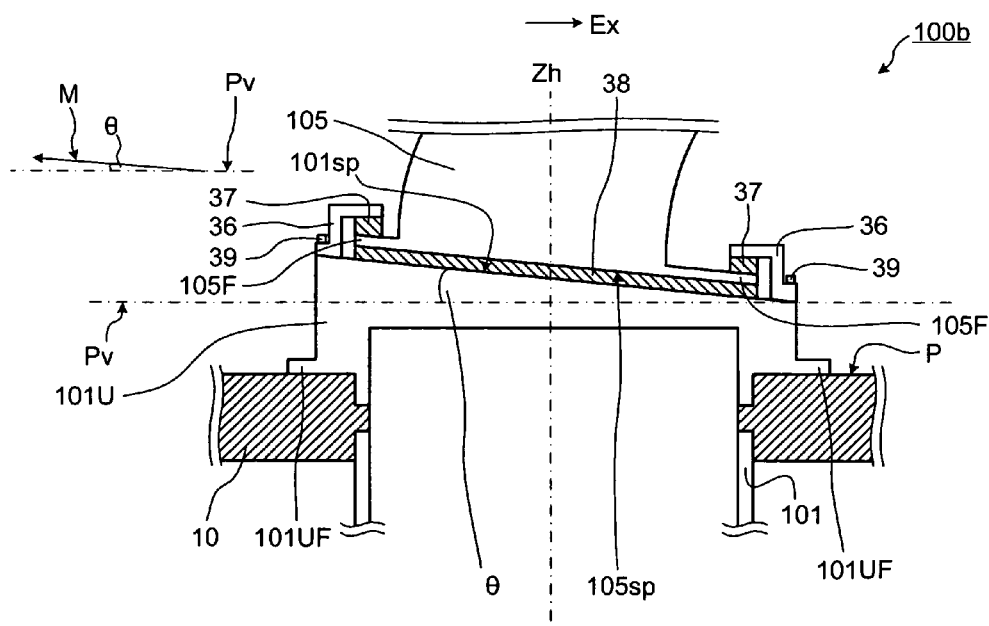
FIG. 11 is a schematic view showing a heater, a regenerator, and a cooler which is attached to the regenerator at the high-temperature cylinder side, of a stirling engine according to a second modification of the present embodiment.

In a second modification of the present embodiment, the heater that configures the heat exchanger is secured to the base at the low-temperature cylinder side, and the heater can relatively shifts with respect to the high-temperature cylinder. Other configurations are similar to the configurations in the above embodiment. FIG. 11 is a schematic view showing the heater, the regenerator, and the cooler which is attached to the regenerator at the high-temperature cylinder side, of the stirling engine according to the second modification of the present embodiment.

In the stirling engine 100b as shown in FIG. 11, the heater-attaching member 101U that attaches the heater 105 to the high-temperature cylinder 101 side is attached to the base face P of the base 10 by an attaching flange 101UF. The high-temperature cylinder 101 is attached to one face of the base 10 opposite to the face to which the heater-attaching member 101U of the base 10 is attached. The high-temperature piston 103 (see FIG. 1) enters into the heater-attaching member 101U while the stirling engine 100b is driven. Thus, the heater-attaching member 101U configures one portion of the high-temperature cylinder 101. In the present modification, the heater 105 is secured to the base 10 at the low-temperature cylinder 102 side. The heater 105 may be secured to the base 10 through a heater-connecting member, or may directly be secured to the base 10.

The heater 105 is placed and held on top of the heater-side end face 101sp of the heater-attaching member 101U. Here, a seal 38 is provided between a heater-connecting-member-side end face 105sp and a heater-side end face 101sp. The working fluid leakage between the heater 105 and the heater-attaching member 101U is minimized by the seal 38. The seal 38 having high heat endurance is used since the high-temperature cylinder 101 and the heater 105 gains high temperature while the stirling engine 100b is driven.

A heater flange 105F is provided at the outer periphery of the heater 105. Then, the heater flange 105F is pressed against the heater-side end face 101sp of the heater-attaching member 101U through an elastic body 37 whereby the heater flange 105F, elastic body 37, and heater-side end face 101sp are clamped by a heater clamp 36, and the heater clamp 36 is secured to the heater-attaching member 101U by a bolt 39. Here, the heater clamp 36 corresponds to a heater-attaching means and the bolt 39 corresponds to a securing means. Thus, the heater 105 is attached to the base 10 through the heater-attaching member 101U. Since the working fluid with high temperature and high pressure flows inside the heater 105 and the high-temperature cylinder 101, the bolt 39 is secured so that the bolt 39 withstands the pressure of the working fluid.

Thus, the heater 105 is attached to the heater-attaching member 101U, and the heater 105 shifts along the heater-side end face 101sp of the heater-attaching member 101U. Here, the heater-attaching member 101U is secured to the base 10, and the high-temperature cylinder 101 is secured to the base 10 through the heater-attaching member 101U. Therefore, the heater 105 shifts in the direction approximately orthogonal to the central axis Zh of the high-temperature cylinder 101 and in the direction approximately parallel to the flow direction of the exhaust gas Ex, independently of the high-temperature cylinder 101.

In the stirling engine 100b according to the second modification as shown in FIG. 11, the heater-connecting-member-side end face 105sp of the heater 105 and the heater-side end face 101sp of the heater-attaching member 101U incline with a predetermined inclination angle θ with respect to the virtual base face Pv that is parallel to the base face P. The inclination of the heater-connecting-member-side end face (inclined face) 105sp and the heater-side end face (inclined face) 101sp are provided in the way similar to those in the stirling engine 100 according to above embodiment (FIGS. 5A and 5B). In the present modification, the heater-side end face 101*sp* having the inclination corresponds to the guiding portion. The reason for providing the inclination is described in the above embodiment. Therefore, the heater 105 may shift along the deforming direction of the heater 105. As a result, when the heater 105 is shifted, the stirling engine suppresses decrease in endurance of the heater 105 since the excessive stress affecting the heater 105 is minimized.

In the stirling engine 100*b* according to the second modification, the heater 105 can shift independently of the high-temperature cylinder 101. Thus, the clearance tc (FIG. 3) held in between the cylinder and the piston is kept in a permissible range since the deformation of the heater 105 due to the heat expansion does not influence the high-temperature cylinder 101 and the low-temperature cylinder 102. As a result, while driving the stirling engine 100*b*, the gas bearing GB (FIGS. 1 and 3) formed in between the cylinder and the piston functions sufficiently.

While configuring the heater 105 independently shiftable with respect to the high-temperature cylinder 101 as shown in the second modification, the regenerator 106 or the heater 105 may also be configured independently shiftable with respect to the low-temperature cylinder 102 as described in the above embodiment or the above first modification. By configuring the stirling engine as described above, overall shifting of the heater 105 becomes large, thus the influence of the deformation on the high-temperature cylinder 101 and the low-temperature cylinder 102 can be minimized, even when the deformation due to the heat expansion of the heater 105 is large.

In the present embodiment and its modifications, the heater included in the heat exchanger may independently shift relative to at least one of the high-temperature cylinder and the low temperature cylinder. Even though the heater is deformed in the direction in which the high-temperature cylinder and the low-temperature cylinder separate from each other due to the heat expansion of the heater, this deformation does not influence the high-temperature cylinder and the low-temperature cylinder. In the stirling engine described above, the influence of the heat expansion of the heater can be minimized while driving the stirling engine, thus the clearance between the cylinder and the piston is kept in permissible range. As a result, the gas bearing formed between the cylinder and the piston functions sufficiently.

As can be seen from the foregoing, the exhaust heat recovery apparatus according to the present invention is suitable for the recovery of exhaust heat from the internal combustion engines, or from the factories, and in particular, is suitably employed for reducing the influence of deformation of the heater caused by the heat expansion.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An exhaust heat recovery apparatus comprising:
   a first piston;
   a second piston;
   a high-temperature cylinder in which the first piston reciprocates;
   a low-temperature cylinder in which the second piston reciprocates, a central axis of the high-temperature cylinder being approximately parallel to a central axis of the low-temperature cylinder, and the high-temperature cylinder and the low-temperature cylinder being positioned approximately orthogonal to a crankshaft and constituting an α-type inline two-cylinder stirling engine; and
   a heat exchanger including a heater, a regenerator and a cooler, where
   the heater having an approximately U-shape, one end portion being secured to a side of the high-temperature cylinder, and the other end portion being arranged to a side of the regenerator,
   the regenerator having one end portion being arranged to a side of the heater, and the other end portion being arranged to a side of the cooler,
   the cooler having one end portion being arranged to a side of the regenerator, and the other end portion being secured to the low-temperature cylinder, heat medium flowing a direction approximately parallel to the crankshaft, wherein
   the regenerator is shiftable along a regenerator-side end face of the cooler with respect to a direction approximately orthogonal to a central axis of the low-temperature cylinder and a direction pointing from the high-temperature cylinder to the low-temperature cylinder.

2. The exhaust heat recovery apparatus according to claim 1, wherein
   the high-temperature cylinder and the low-temperature cylinder support the first piston and the second piston, respectively, through a gas bearing.

3. The exhaust heat recovery apparatus according to claim 2, wherein
   the first piston and the second piston are connected to the crankshaft through a connecting rod with an approximate linear mechanism.

4. The exhaust heat recovery apparatus comprising:
   a first piston;
   a second piston;
   a high-temperature cylinder in which the first piston reciprocates;
   a low-temperature cylinder in which the second piston reciprocates, a central axis of the high-temperature cylinder being approximately parallel to a central axis of the low-temperature cylinder, and the high-temperature cylinder and the low-temperature cylinder being positioned approximately orthogonal to a crankshaft and constituting an α-type inline two-cylinder stirling engine; and
   a heat exchanger including a heater, a regenerator and a cooler, where
   the heater having an approximately U-shape, one end portion being secured to a side of the high-temperature cylinder, and the other end portion being arranged to a side of the regenerator,
   the regenerator having one end portion being arranged to a side of the heater, and the other end portion being arranged to a side of the cooler,
   the cooler having one end portion being arranged to a side of the regenerator, and the other end portion being secured to the low-temperature cylinder, heat medium flowing a direction approximately parallel to the crankshaft, wherein a regenerator-side end face of the cooler is inclined to a predetermined inclination angle to a deforming direction of the heater due to heat expansion, and the regenerator is shiftable along a regenerator-side end face of the cooler with respect to a direction pointing from the high-temperature cylinder to the low-temperature cylinder.

5. The exhaust heat recovery apparatus according to claim 4, wherein the high-temperature cylinder and the low-temperature cylinder support the first piston and the second piston, respectively, through a gas bearing.

6. The exhaust heat recovery apparatus according to claim 5, wherein the first piston and the second piston are connected to the crankshaft through a connecting rod with an approximate linear mechanism.

* * * * *